United States Patent
Parkhomovsky et al.

(10) Patent No.: US 7,625,468 B2
(45) Date of Patent: Dec. 1, 2009

(54) ELECTRODE FOR ELECTROCHEMICAL MACHINING

(75) Inventors: Alexander Parkhomovsky, San Jose, CA (US); Lev M. Dvoskin, San Jose, CA (US); Roger A. Addy, Gilroy, CA (US); Robert M. Pelstring, Santa Cruz, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 153 days.

(21) Appl. No.: 11/375,010

(22) Filed: Mar. 15, 2006

(65) Prior Publication Data

US 2007/0215458 A1 Sep. 20, 2007

(51) Int. Cl.
C25D 17/14 (2006.01)
C25D 17/12 (2006.01)

(52) U.S. Cl. .................. 204/224 M; 204/225; 204/280; 205/648; 205/649; 205/652; 205/653; 205/686

(58) Field of Classification Search ............ 204/224 M, 204/225, 280; 205/648, 649, 652, 653, 663, 205/686
See application file for complete search history.

(56) References Cited

U.S. PATENT DOCUMENTS

| | | | |
|---|---|---|---|
| 6,312,584 B1 | 11/2001 | Altena et al. | |
| 6,524,451 B1 | 2/2003 | Cochran | |
| 6,638,414 B2 | 10/2003 | MacLeod et al. | |
| 6,767,438 B2 | 7/2004 | Cochran | |
| 6,878,255 B1 | 4/2005 | Wang et al. | |
| 6,878,480 B2 | 4/2005 | Ruhl et al. | |
| 6,884,330 B2 | 4/2005 | Steele | |
| 6,900,568 B2 | 5/2005 | LeBlanc et al. | |
| 2002/0134683 A1 | 9/2002 | Steele | |
| 2005/0082173 A1* | 4/2005 | Oelsch | 205/640 |
| 2007/0217076 A1* | 9/2007 | Sheth et al. | 360/230 |

* cited by examiner

*Primary Examiner*—Bruce F Bell
(74) *Attorney, Agent, or Firm*—Shumaker & Sieffert, P.A.

(57) ABSTRACT

An electrode containing a dielectric layer on a surface of the electrode and an active zone containing a metal embedded below the surface of the electrode, wherein the electrode is configured to form a groove pattern on a workpiece by an electrochemical machining process is disclosed. The electrode is capable of manufacturing a workpiece such as a counter plate, a sleeve journal or a conical bearing containing a groove pattern for fluid dynamics bearing, the groove pattern having a pitch of less than 80 microns. The electrode could be made by a method including depositing a dielectric layer on a surface of a metal, depositing a photoresist layer on the dielectric layer, printing a groove pattern on the photoresist layer, etching or physico-chemically removing portions of the dielectric photoresist layers to form grooves in the dielectric layer; removing the photoresist layer; and filling the grooves with a metal to produce the electrode.

10 Claims, 9 Drawing Sheets

MICROFABRICATED ELECTRODE AND ITS OPERATION

Raised dielectric surface

Etched work surface

(a) CONVENTIONALLY MACHINED ELECTRODE
(b) MICROFABRICATED ELECTRODE

Figures 8a and 8b

MICROFABRICATED ELECTRODE AND ITS OPERATION

ELECTRODE FOR ELECTROCHEMICAL MACHINING

FIELD OF THE INVENTION

The present invention relates to an electrode for electrochemical machining, particularly to make groove patterns for fluid dynamics bearing (FDB) on thrust and journal of a motor of a disk drive.

BACKGROUND

Magnetic discs with magnetizable media are used for data storage in most all computer systems. Current magnetic hard disc drives operate with the read-write heads only a few nanometers above the disc surface and at rather high speeds, typically a few meters per second.

Generally, the discs are mounted on a spindle that is turned by a spindle motor to pass the surfaces of the discs under the read/write heads. The spindle motor generally includes a shaft fixed to a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Figure 1:
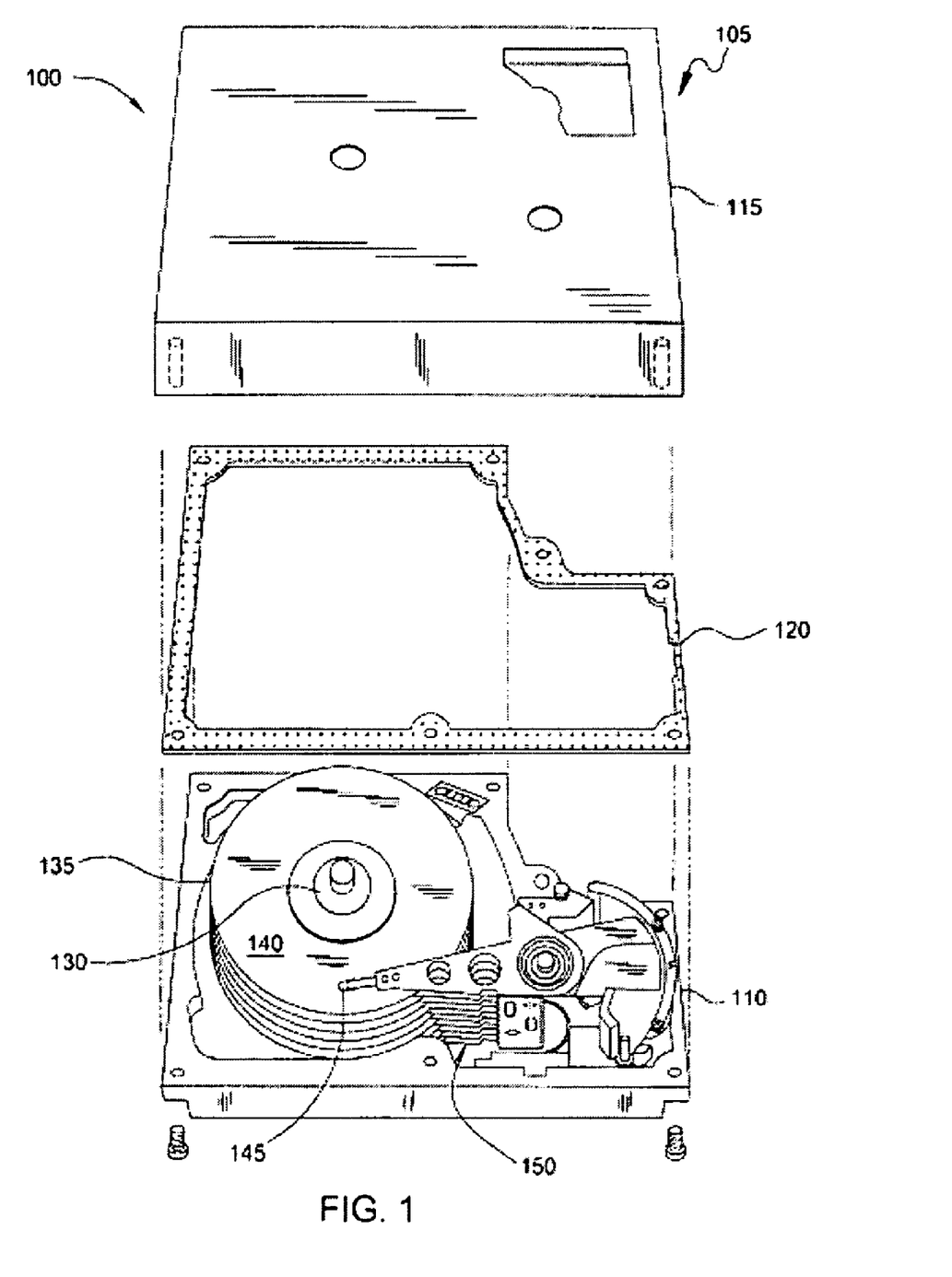
FIG. 1 shows a schematic of a magnetic disc drive.

FIG. 1 shows a schematic of a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of a several radially spaced tracks (not shown). This allows the read/write heads 145 to read and write magnetically encoded information to the magnetic media on the surfaces 140 of the discs 135 at selected locations.

Over the years, storage density has tended to increase and the size of the storage system has tended to decrease. This trend has lead to greater precision and lower tolerance in the manufacturing and operating of magnetic storage discs. For example, to achieve increased storage densities the read/write heads must be placed increasingly close to the surface of the storage disc. This proximity requires that the disc rotate substantially in a single plane. A slight wobble or run-out in disc rotation can cause the surface of the disc to contact the read/write heads. This is known as a "crash" and can damage the read/write heads and surface of the storage disc resulting in loss of data.

From the foregoing discussion, it can be seen that the bearing assembly which supports the storage disc is of considerable importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor because of low damping.

One alternative bearing design is a hydrodynamic bearing. In a hydrodynamic bearing, a lubricating fluid such as air or liquid provides a bearing surface between a fixed member of the housing and a rotating member of the disc hub. In addition to air, typical lubricants include oil or other fluids. Hydrodynamic bearings spread the bearing interface over a large surface area in comparison with a ball bearing assembly, which comprises a series of point interfaces. This is desirable because the increased bearing surface reduces wobble or run-out between the rotating and fixed members. Further, the use of fluid in the interface area imparts damping effects to the bearing which helps to reduce non-repeat run out.

Dynamic pressure-generating grooves (i.e., hydrodynamic grooves) disposed on journals, thrust, and conical hydrodynamic bearings generate localized area of high fluid pressure and provide a transport mechanism for fluid or air to more evenly distribute fluid pressure within the bearing, and between the rotating surfaces. The shape of the hydrodynamic grooves is dependant on the pressure uniformity desired. The quality of the fluid displacement and therefore the pressure uniformity is generally dependant upon the groove depth and dimensional uniformity. For example, a hydrodynamic groove having a non-uniform depth may lead to pressure differentials and subsequent premature hydrodynamic bearing or journal failure.

As the result of the above problems, electrochemical machining (ECM) of grooves in a hydrodynamic bearing has been developed. Broadly described, ECM is a process of removing material metal without the use of mechanical or thermal energy. Basically, electrical energy is combined with a chemical to form an etching reaction to remove material from the hydrodynamic bearing to form hydrodynamic grooves thereon. To carry out the method, direct current is passed between the workpiece (e.g., counter plate, sleeve journal, or a conical bearing) which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into solution, with the electrolyte as metal ions and form metallic hydroxides. These metallic hydroxide (MOH) molecules are carried away to be filtered out. However, this process raises the need to accurately and simultaneously place grooves on a surface across a gap which must be very accurately measured, as the setting of the gap could determine the rate and volume at which the metal ions are carried away. Even in simple structures, this problem can be difficult to solve. When the structure is the interior surface of a conical bearing, the setting of the gap width can be extremely difficult. Manufacturability issues associated with conical parts often make it difficult to control the diameter of the cones. Due to mechanical tolerances, the workpiece may be misaligned with the electrode causing an uneven gap and a correspondingly uneven depth hydrodynamic groove. Therefore, it is difficult to make a tool with fixed electrodes that could guarantee a continued consistent workpiece to electrode gap to form dimensionally consistent hydrodynamic grooves.

Advanced groove patterns on thrust and journal are currently manufactured by an ECM process. The electrode used in the ECM process is made of high conductivity material and usually has a cylindrical shape with workpiece surface machined to reflect 3D pattern of a particular shape and depths.

The ECM process uses a shaped electrode to supply electrical flux fields thru an electrolyte to cause metal removal from the work piece in the areas influenced by these fields. The electrode has regions of conducting material separated by regions of insulating material. The shape and pattern of these regions is generally in the reverse image of the areas to be machined by the electrochemical action. Machining occurs in the zones of the conducting region and is restricted in the zones of insulating material. These electrodes may be complex and multidimensional in shape.

Fabrication of these electrodes is dependent on techniques that allow construction of alternating zones of conducting and insulating materials. Typical restrictions in fabrication capability include limited sizes of traditional machine cutting tools and capability to form single piece multidimensional structures. We propose photolithography as a possible cost saving technique since we can utilize batch processes in deposition and etch.

Figure 2:
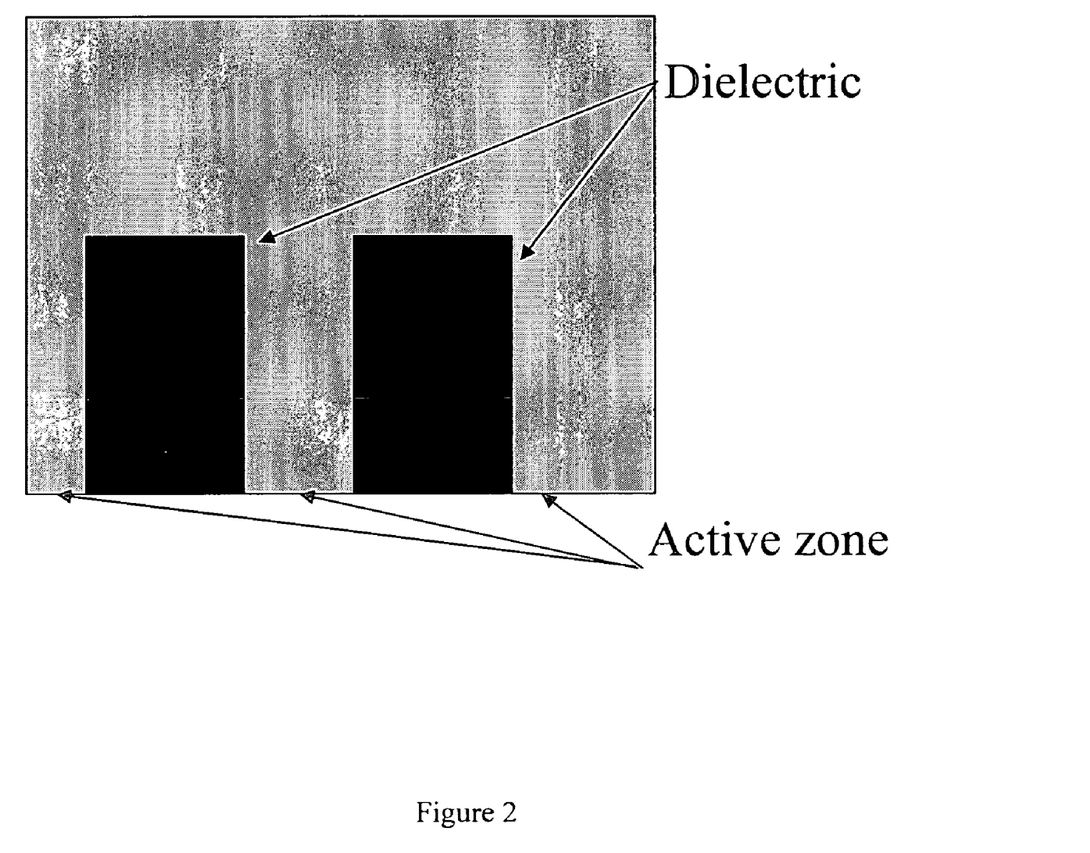
FIG. 2 is a schematic diagram of an ECM electrode. The dielectric material fills the initially machined voids in the metal and excess of the dielectric is polished away so that the active zone and dielectric are on the same level.

The electrode workpiece surface pattern can be manufactured by a variety of techniques such as milling, etching or laser machining. Once the 3D pattern is manufactured on the electrode workpiece surface the dents are filled with the dielectric material followed by the dielectric grinding step bringing the dielectric layer electrode workpiece zone (metallic surface) to the same level as the dielectric surface. The ECM electrode manufactured this way is schematically shown in FIG. 2. The layer of dielectric acts as the separator of the electric field between two neighboring active zones on the electrode and generally determines the feature width of the workpiece based on the feature width of the electrode workpiece surface pattern. The disadvantages of such electrode design are the following:

(a) An increased probability of arcing with a reduction in machining gap;
(b) An occasional mechanical contact of the electrode workpiece surface with the sample surface that leads to damaging the electrode workpiece surface and its destruction; this is especially characteristic in mass production;
(c) If the conductive path is narrow the metal/dielectric interface is prompt to overheating that leads to electrode disintegration;
(d) The smallest feature width that can be obtained by conventional milling technique for this electrode design is 35 microns;
(e) The laser machining time for feature pattern is of the order of several hours per electrode; and
(f) The throughput limit is 1 electrode per system.

Therefore, a need exists for improved electrodes and method of manufacturing the same to provide a reliable method and apparatus for forming hydrodynamic grooves that is accurate and cost effective.

SUMMARY OF THE INVENTION

The embodiments of the invention relate to an electrode comprising a dielectric layer that forms a surface of the electrode and an active zone comprising a metal embedded below the surface of the electrode. Preferably, the electrode is configured to form a groove pattern on a workpiece by an electrochemical machining process. Preferably, the dielectric layer comprises a groove pattern comprising grooves having a feature width of 25 microns or less. Preferably, the dielectric layer comprises a groove pattern comprising grooves having a feature width of 12 microns or less. Preferably, the dielectric layer comprises a groove pattern comprising grooves and the active layer is within the grooves. Preferably, the groove comprises a cylinder shaped groove or a truncated cone shaped groove. Preferably, the dielectric layer has a thickness in a range of about 1 to 5 microns. Preferably, the electrode is configured to form a groove pattern in a workpiece at substantially zero machining gap with no arcing.

Another embodiment of the invention relates to a workpiece comprising a groove pattern for fluid dynamics bearing, the groove pattern having a pitch of less than 80 microns. Preferably, the groove pattern has a feature width of 25 microns or less. Preferably, the groove pattern has a feature width of 20 microns or less at a gap of 5 microns or less. Preferably, the workpiece is a counter plate, a sleeve journal or a conical bearing.

Yet another embodiment relates to a method of manufacturing an electrode comprising depositing a dielectric layer on a surface of a metal, depositing a photoresist layer on the dielectric layer, printing a groove pattern on the photoresist layer, etching or physico-chemically removing portions of the dielectric photoresist layers to form grooves in the dielectric layer; removing the photoresist layer; and filling the grooves with a metal to produce the electrode. Preferably, the thickness of the dielectric layer is controlled by in-situ metrology. Preferably, the metal is Cu. Preferably, the electrode comprises a work surface containing the metal, the work surface comprising grooves having a feature width of 20 microns or less.

Yet another method relates to a method comprising contacting an electrode to a workpiece with a gap of 5 microns or less between the electrode and the workpiece, and forming a groove pattern in the workpiece. Preferably, the forming the groove pattern is without arcing. Preferably, the gap is substantially zero. The method could further comprise focusing energy from the electrode to the workpiece to substantially prevent overburn of the groove pattern in the workpiece.

Additional advantages of this invention could become readily apparent to those skilled in this art from the following detailed description, wherein only the preferred embodiments of this invention is shown and described, simply by way of illustration of the best mode contemplated for carrying out this invention. As could be realized, this invention a property of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention could be better understood by reference to the Detailed Description of the Invention when taken together with the attached drawings, wherein:

FIG. 5 provides the information on the ECM machined part using micro fabricated electrode of the embodiments of this invention.

FIG. 8 shows a schematic diagram showing (a) the conventional electrode versus (b) the microfabricated electrode of the embodiments of the invention. The machining gap is much smaller in case of the micro fabricated electrode due to a thin (about 1-2 microns) layer of dielectric deposited on the surface of the metal and embedded working surface of the electrode. The resulting grooves on the workpiece are narrower due to the more focused electric field reducing the overburn. Also, there is substantially no resistance increase and substantially no heat generation leading to dielectric meltdown in the novel electrode of FIG. 8b as in case of the conventional electrode of FIG. 8a.

DETAILED DESCRIPTION OF THE INVENTION

In the embodiments of the invention, the grooved parts of fluid dynamic bearings motors could be manufactured by means of electrochemical machining process (ECM). The groove shapes and widths as well as the groove density along with a decrease in the flight height provide the overall bearing performance. The grooves in some embodiments may serve as microchannels for fluid delivery and distribution.

Among the embodiments of this invention, electrochemical machining is a manufacturing technique that could be used to fabricate grooves on fluid dynamic bearing workpiece parts of various geometries. As explained above, the ECM apparatus consists of the electrode, the electrolytic bath, the workpiece part and the fixture that sets a specific gap between the electrode and the workpiece. Applying the electric potential at high electric currents through the gap allows for pattern transfer from the electrode to the surface of the workpiece part. The depth of the resulting groves depends mainly on the machining gap, the electric current, and the deposition time. The widths of the grooves as well as their shape and their density (the number of grooves per unit area of the part) are defined by the machining gap between the ECM electrode (ECM apparatus) and the workpiece, the electrolyte flow rate through the machining gap and the feature geometries of the ECM electrode. These factors could determine the width and wall straightness (squareness) of the grooves geometries on the part.

The widths of electrochemically machined grooves on the workpiece parts are generally larger than the original features on the electrode due to the phenomenon called the overburn. One of the main factors affecting the groove widths of the workpiece part is the electrode pattern feature widths.

The electrodes of the embodiments of the invention have a feature width of the electrode in the range of 1 to 100 microns, preferably 5 to 50 microns, and more preferably 10 to 20 microns. In one embodiment, the feature width of the electrode was 11 microns. By using the ECM process and the electrodes of the embodiment of this invention, one can produce high density grooves-three to five times the groove density as that produced by the conventional electrode which allows 100 micron minimum groove widths on the grooved part and the limited density of the grooves. For example, the embodiments of this invention produces grooves on a workpiece with a pitch in the range of 10 to 150 micron and preferably in the range of 50 to 100 microns with feature width of the workpiece in the range of 2 to 150 microns, preferably 5 to 100 microns, and more preferably 10 to 30 microns. In one embodiment, the pitch of the grooves on the workpiece was 80 microns (as compared to 200 microns pitch density of the grooves of a conventional workpiece) and the feature width of the workpiece was 20 microns.

The feature geometries (feature widths, depths and the wall straightness (squareness)) of the ECM electrode are defined by its manufacturing process. The ECM electrode is currently manufactured by means of the end milling process that limits the electrode feature widths to 35 microns (minimum end mill dimensions) and feature depth to 100 microns.

In current electrodes, the working surface of the electrode is located on the same level with the electrode outer surface that limits the minimum machining gap between the electrode and the workpiece to 15 microns during the formation of the grooves on the workpiece. Any further reduction in the machining gap leads to arcing between the electrode workpiece surface and the workpiece part destroying the electrode.

In the course of this invention, the inventors found that the new generations of high performance motor products would require a significant reduction in the widths of the grooves to 20 microns and an increase in the groove densities per area (keeping 0.5 groove to pitch ratio) on the workpiece part as well as the wall straightness (straight vertical walls) on the workpiece part. To achieve these characteristics on the part the inventors recognized that it would be required to reduce the machining gap to about 5 microns or less and to reduce the ECM electrode feature sizes to about 10 microns. This reduction is not possible using the conventional electrode design and the electrode manufacturing techniques while the electrode of the embodiments of this invention would allows the desired reduction in machining gap and feature sizes.

Figure 3:
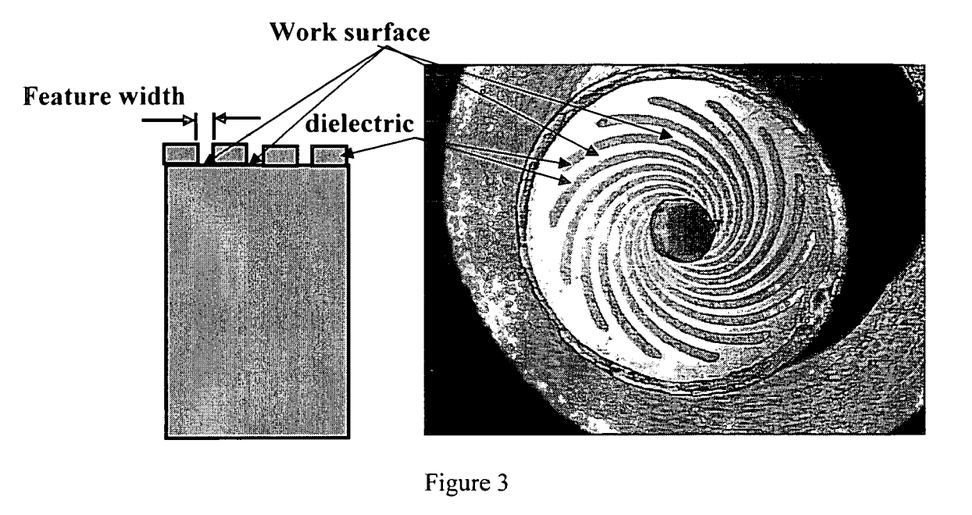
FIG. 3 is a side view (schematic) and top view of the electrode of an embodiment of this invention with embedded workpiece surface and outer dielectric surface.

To remedy the deficiencies of the conventional electrode design, the inventors arrived at an ECM electrode design in which the electrode workpiece surface is embedded below the electrode outer surface as schematically shown in FIG. 3. In the preferred embodiment of the electrode, the electrode blank is covered with a thin layer of dielectric film. The features on the electrode workpiece surface can, for example be manufactured using micro-fabrication processes /photolithography/etch micro-fabrication process, lithography, deep etch, molding (or electroforming) that are used to produce MEMS.

"Micro-Electro-Mechanical Systems" or MEMS is the integration of mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components could be fabricated using compatible "micromachining" processes that selectively etch away parts of the silicon wafer or add new structural layers to form the mechanical and electromechanical devices. Microelectronic integrated circuits can be thought of as the "brains" of a system and MEMS augments this decision-making capability with "eyes" and "arms", to allow microsystems to sense and control the environment. Sensors gather information from the environment through measuring mechanical, thermal, biological, chemical, optical, and magnetic phenomena. The electronics then process the information derived from the sensors and through some decision making capability direct the actuators to respond by moving, positioning, regulating, pumping, and filtering, thereby controlling the environment for some desired outcome or purpose. Because MEMS devices are manufactured using batch fabrication techniques similar to those used for integrated circuits, unprecedented levels of functionality, reliability, and sophistication can be placed on a small silicon chip at a relatively low cost.

In addition to its function as the electric path limiter, the surface of the dielectric layer acts as the outer contact surface thus protecting electrode workpiece surface from damage during the occasional mechanical contact with the sample. The minimum feature width of such electrode could be a fraction of microns due to a use of patterning and semiconductor micro fabrication techniques. This in turn reduces the cost of manufacturing for a single electrode due to a use of batch processing.

The embodiments of the electrodes of this invention have an electrode workpiece surface located below the outer surface of the electrode. Initially, the electrode outer surface could be covered with a thin (approximately 2 microns thick) layer of a dielectric material such as silicon nitride, silicon dioxide or similar. The features on the electrode were then etched through the dielectric layer with the pattern of the features corresponding to the desired ECM pattern on the workpiece.

The inventors found out that the electrodes of the embodiments of this invention have significant advantages with respect to workpiece part manufacturing. It allows for the reduction in the machining gap between the outer electrode workpiece surface and the workpiece part up to zero. The reduction in the machining gap leads to a reduction in the final groove widths on the part. The reduction in the machining gap in turn allows for an increase in the density of the grooves per area on the workpiece part and the increase in the grooves straightness during the ECM process, which are desired parameters for good bearing performance.

The electrode design of the electrode of the embodiments of the invention with the layer of the dielectric covering its outer surface could be manufactured in its entirety by means of micro fabrication technology. Initially, the electrode blank of the cylindrical shape could be covered on top (flat part) with a thin (2 microns) layer of dielectric material such as SiNx, SiO2 or similar. Optionally, an adhesion promoter (such as Ti/W) buffer layer of a small thickness ~200-1000 Angstroms thick) could be first deposited on the conductive electrode blank prior to the deposition of the dielectric film by means of physical vapor deposition(sputtering). Preferably, the outer cylinder surface a dielectric coating such as benzocyclobutene is deposited via spin on deposition process (SOD). The layer of the photoresist could then be spun onto the surface of the electrode followed by the resist being baked and exposed with the pattern of the electrode working features by means of photolithography using the photolithographic mask. The patterned photoresist could then be developed and the features etched through the dielectric film to the conductive layer using, for example, wet etch chemistry or deep reactive ion etch (RIE) with an etch stop. The unprocessed photoresist could finally be removed by lift off techniques and the final electrode would be ready to be used in the ECM process.

Figure 4A:
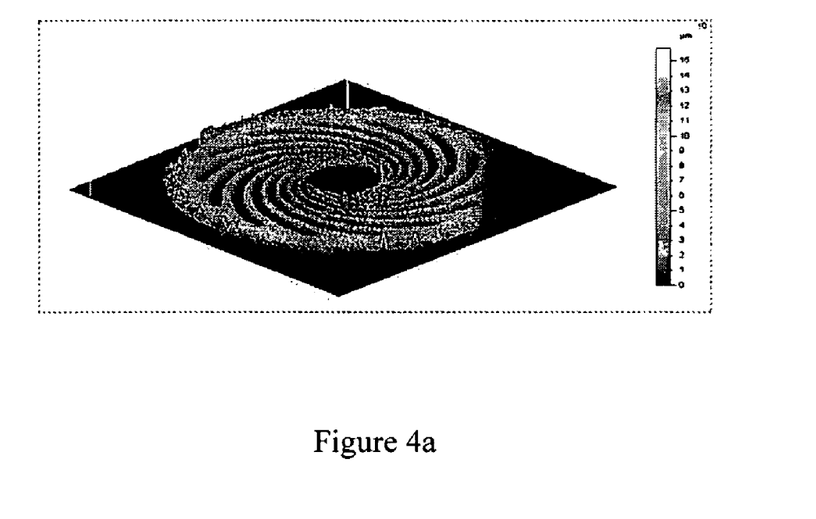
FIG. 4a shows a 3-D surface profiler image of a thrust electrode surface manufactured using semiconductor microfabrication techniques. The electrode workpiece surface is exposed beneath the dielectric layer protecting it from damage by mechanical contact or arcing.
Figure 4B:
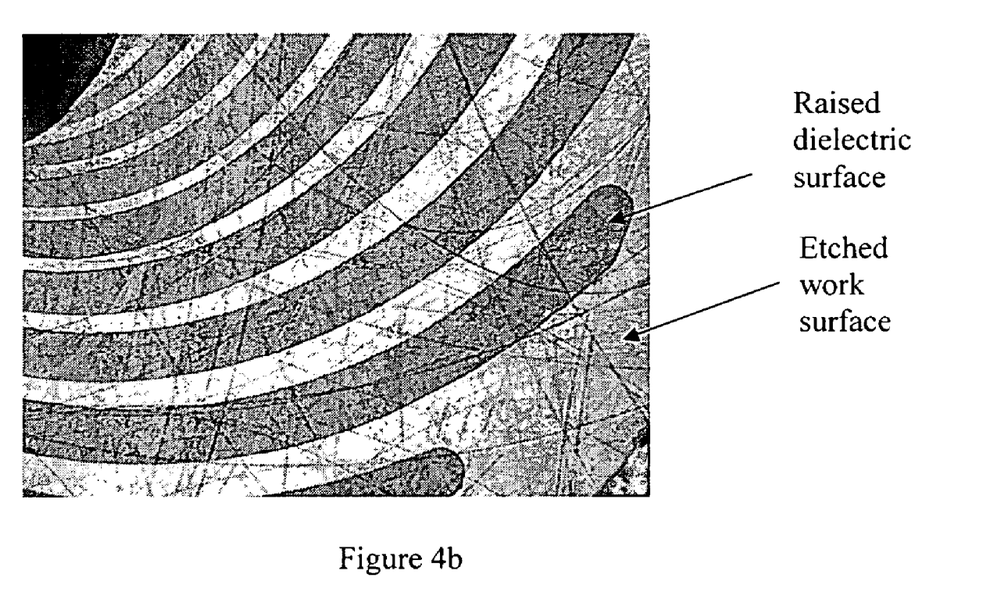
FIG. 4b shows the top view of the workpiece surface showing a dielectric and embedded workpiece surface.

In one example, an image of the workpiece surface of the thrust electrode that has been manufactured using microfabrication processes including photolithography techniques from a cylindrical brass material is shown in FIG. 4a. The workpiece surface of the electrode of the example was covered with a 2 micron thick layer of SiNx dielectric film that is deposited using physical vapor deposition process on top of 400 A thick Titanium/Tungsten buffer layer to reduce probability of crack formation due to a difference in thermal expansion coefficients between the brass alloy and SiNx. The patterned electrode was etched by reactive ion etch technique opening the features embedded inside the dielectric layer according to the electrode pattern as shown in FIG. 4b. The electrode was then tested in an ECM tool. No arcing between the electrode and the sample was been observed with the reduction in the machining gap during ECM process. Also, upon contact of the electrode with the sample the electrode was not damaged or destroyed.

The above described electrode has been successfully manufactured by the inventors with minimum electrode feature sizes of 12 microns and tested in the ECM process to produce the minimum groove width on the workpiece part of 20 microns at 5 micron gap. With the 5 micron machining gap the resulting wall straightness of the grooves on the workpiece part was as low as 45 degrees (the angle of the groove wall to the horizontal surface of the part). In case of the conventional electrode with the machining gap of 15 micron the resulting groove wall straightness was 22.5 degrees resulting in much wider final groove width.

Figure 5:
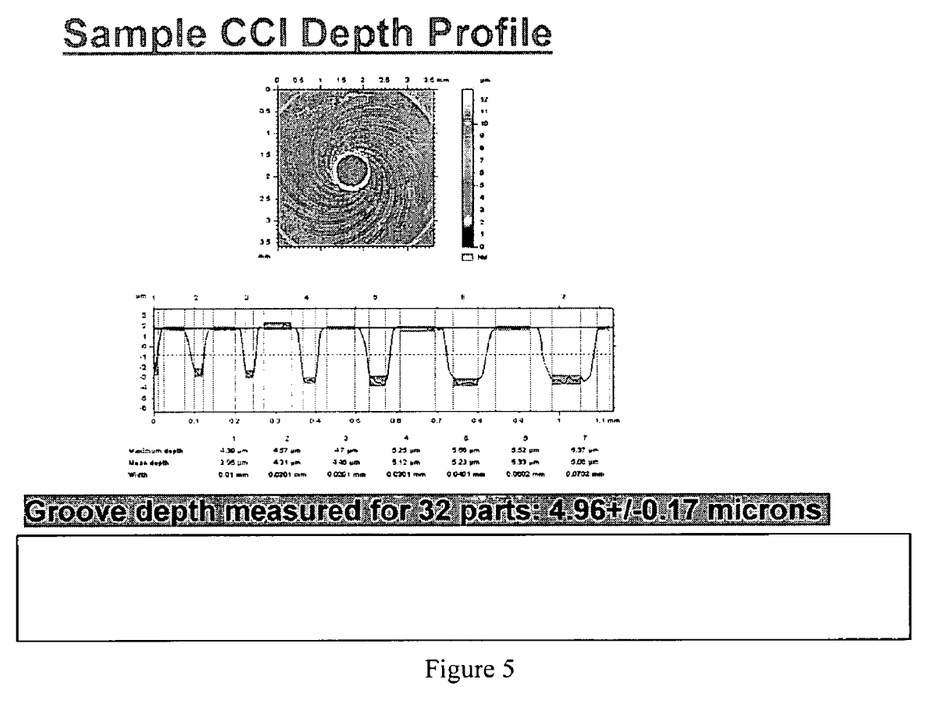
FIG. 5 shows depth profiling scan showing the ECM manufactured grooves on the workpiece parts using micro fabricated ECM electrode. The groove depths are repeated at 4.96+/0.17 microns. The scan shows flat bottoms of the resulting grooves and the increased wall straightness of the grooves.

In one example, the dielectric coated electrode manufactured using micro fabrication technology was tested in the ECM process at a zero machining gap and was not mechanically damaged. It was found that no arcing occurred even at a zero machining gap during the ECM process, i.e. when the outer surface of the electrode was in contact with the workpiece part. FIG. 5 provides the information on the ECM machined part using micro fabricated electrode of the embodiments of this invention.

For journal ECM grooving the cylindrical blank side surface (cylindrical surface) is controllably spin coated with the layer (of about 3 microns) of dielectric materials such as cyclotene (dielectric coating). The adhesion promoter can be spin coated prior to application of the dielectric to the cylindrical surface of the electrode. The inventors developed the direct laser writing system that includes the optical system and the x-y-z movable stage.

The optical system is designed comprising the beam delivery system (diode pumped semiconductor UV laser with peak wavelength of 375 nm) and the set of lenses that include the beam expander and the objective lenses. The optical system produces the beam and focuses the beam to 10 micron spot size on the target (the cylindrical surface of the electrode coated with dielectric and the spun off photoresist). The optical system projects the beam on the target while the x-y-z stage mounted on the CNC lathe is moving in x-y-z directions in the fashion according to the feature pattern on the journal electrode surface. This allows for direct scanning exposure of the photoresist which then developed followed by wet or deep reactive ion etch process that removes the photoresist and etches through the dielectric layer to conductive layer on the electrode. Finally, the unexposed photoresist is removed and the journal electrode is manufactured with feature sizes of 10 microns.

The electrodes of the embodiments of the invention could be manufactured by several different methods, among them being the inverse groove pattern method. This method provides a better control over the feature width and depth dimensions compared to the currently used techniques. The method comprises: (a) Room temperature dielectric deposition on the electrode surfaces; (b) the development of the photolithography mask based on the multi-shaped feature pattern design; (c) photolithographic feature pattern printing from the mask to the electrode work surface; (d) subsequent pattern etching;

and (e) controlled Cu electroplating into the etched openings in the dielectric film or coating.

Figure 6:
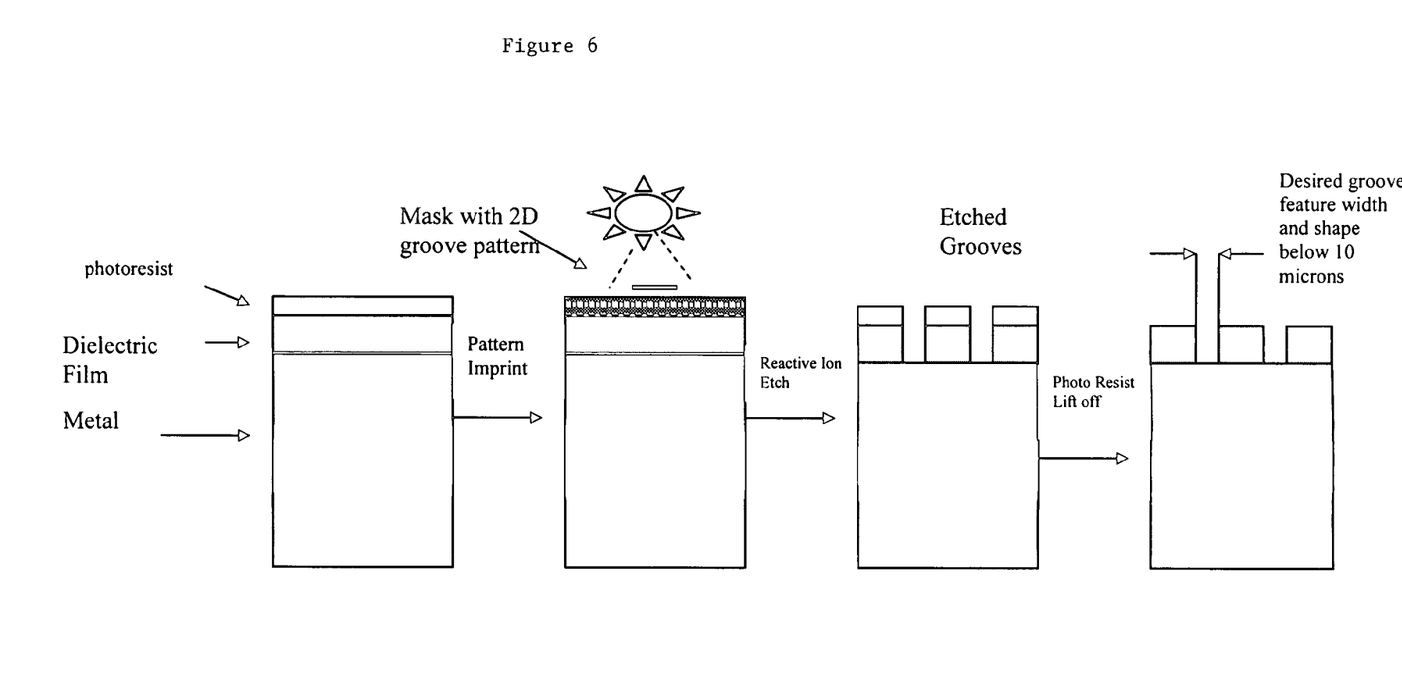
FIG. 6 shows a schematic diagram showing process flow of the inverse groove pattern method for fabrication an ECM electrode.

FIG. 6 schematically demonstrates the inverse groove pattern method. Initially, the edge surface (work surface of the electrode) and side surface of the blank are vacuum deposited (thermal CVD, PECVD or PVD) with a dielectric film of a known thickness. Alternatively the surface may be spin-on deposited with Parylene-like dielectric using spin-on glass spinning wheel. A dielectric deposition process is conducted at an ambient temperature. The thickness of the dielectric is controlled to the Angstrom level by the in-situ metrology of the deposition tool. For the case of vacuum deposition such in-situ metrology can be represented by in situ quartz crystal monitor to measure the flux of Si deposition in the PVD tool. Alternatively, ex-situ ellipsometry or optical reflectometry can be used for certain coatings.

Figure 7:
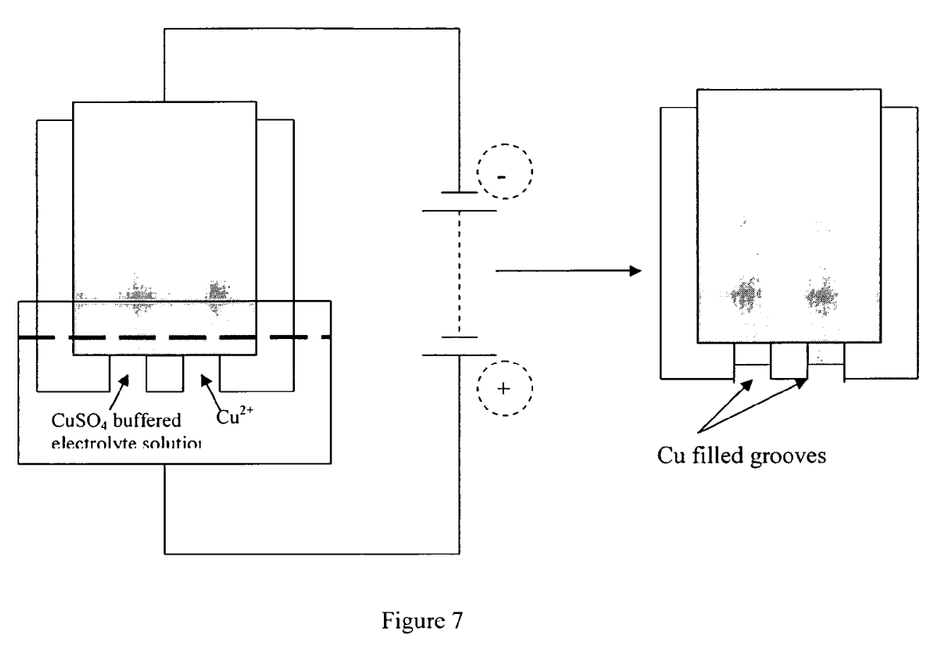
FIG. 7 is a schematic diagram showing controlled trench fill an ECM electrode by Cu electroplating.

The positive photoresist is spin coated on the electrode work surface followed by the resist heat treatment. The groove pattern initially developed on Cr photo mask is then UV or X-ray printed on the photoresist through the photo mask. The work surface of the electrode is then etched in the wet etch bath or reactive ion etch chamber allowing a desired thickness (down to the first metal layer) of the dielectric film be removed according to the photomask exposure pattern (the inverse groove pattern). The unexposed photoresist is then lifted off in chemical solvent. The resulting electrode work surface geometry represents the desired groove geometry with width feature control better or equal to 100 Angstroms. Finally, the grooves in dielectric film are filled with Cu by means of Cu electroplating as shown in FIG. 7.

It has been explained above that the conventional electrode and method of fabrication of grooves in the workpiece result in feature widths on the workpiece substrate that are greater than the corresponding feature widths on the work surface of the electrode due to overburn. This invention remedies this problem by a novel electrode design that greatly reduces the risk of arcing that typically causes overburn. The electrodes of the embodiments of this invention include a separate working surface of the electrode from its front surface (facing the piece part), separated by a thin layer of a dielectric film of controlled thickness (between 1 and 5 microns). The dielectric layer is then imprinted with lithographic pattern features followed by anisotropic etching to create 2-D surface features as described above. The depth of the etched features could be equal to the thickness of the deposited dielectric layer and can be modified by Cu electroplating deposition into the etched openings on the electrode work surface.

Figures 8A, 8B:
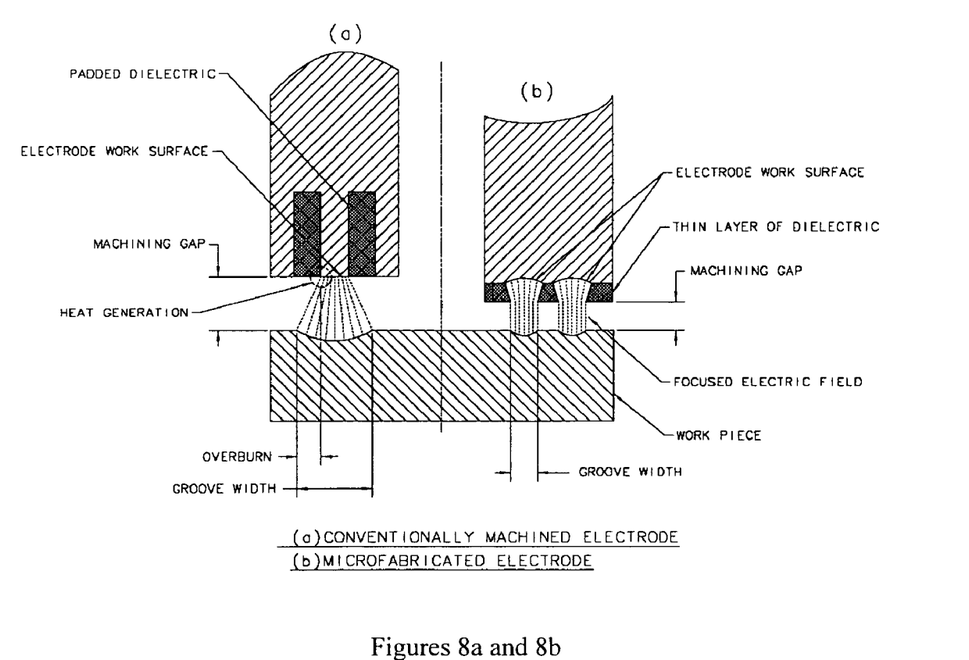
Figure 8C:
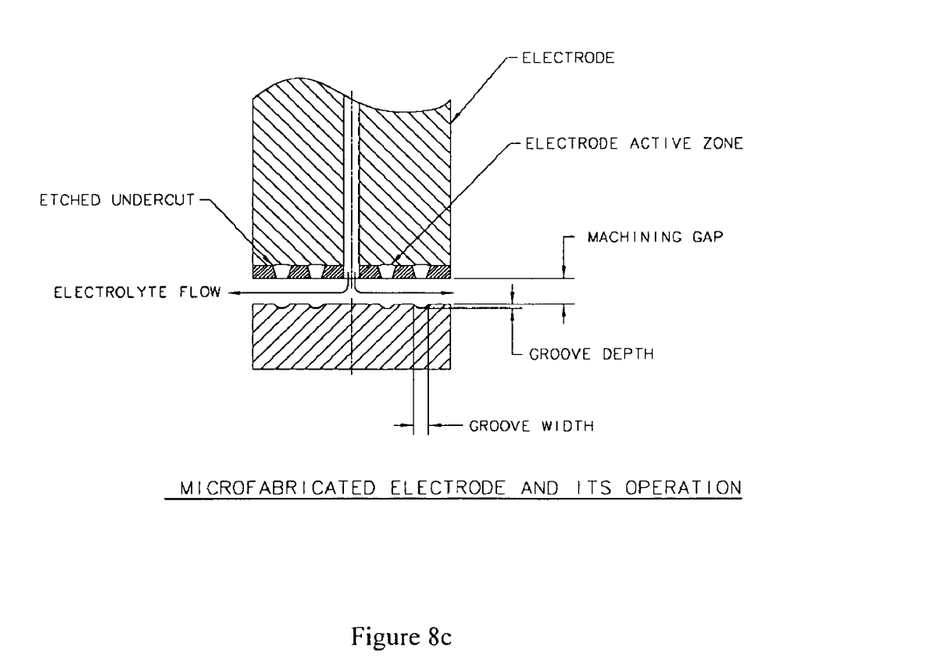
FIG. 8c shows a microfabricated electrode in operation.

The principle of the solution to overburn is schematically shown in FIG. 8 with reference to a conventional electrode (a) and an electrode of the embodiments of the invention (b). In the electrode of FIG. 8b, due to the undercut, the etched electrode active zone area is larger than the area of the openings at the front surface of the dielectric. During the machining process this leads to focusing the discharge electric field that subsequently leads to the formation of smaller groove widths as compared with those manufactured by the conventional electrode of FIG. 8a. FIG. 8c shows a micro-fabricated electrode in operation.

Electrode groove geometries are controlled by the parameters of the etch process. During the etch process the grooves are formed in the dielectric by means of physico-chemically removing the dielectric material from the previously exposed surface area. To understand how V shaped grooves are formed on the ECM electrode one needs to acknowledge that after the first layer of a dielectric is removed from the horizontal surface, a step is formed on the surface. The step is limited by the exposed surface on the bottom and the side walls on the sides. The etch chemistry could also react to a newly formed side walls.

Etch anisotropy is the ratio of the surface removal etch rate to the side wall removal etch rate. For example if the ratio is equal to 1, then etch is isotropic meaning that the material is removed at the same rate from the two perpendicular directions. This could result in expanding the final groove width on the electrode. The final etched grove width in the dielectric layer depends on the thickness of the dielectric, and the etch anisotropy with the latter being controlled by the etch recipe and methodology. This phenomenon while undesired in all semiconductor applications would found to be unexpected useful in this invention as it exposes a larger metal area to further enable ECM process. As the etching cuts through the dielectric layer, it could undercut or remove the dielectric material from underneath the unexposed photoresist due to isotropic effect. The resulting structure could have a continuous expansion in groove widths as the etch cuts through the dielectric layer. The angle of undercut can be controlled by the etch chemistry. The resulting V shaped groove on the electrode allows one to focus the electric field at the surface and is a parameter in controlling the ECM process as shown in FIG. 8C.

Figure 9:
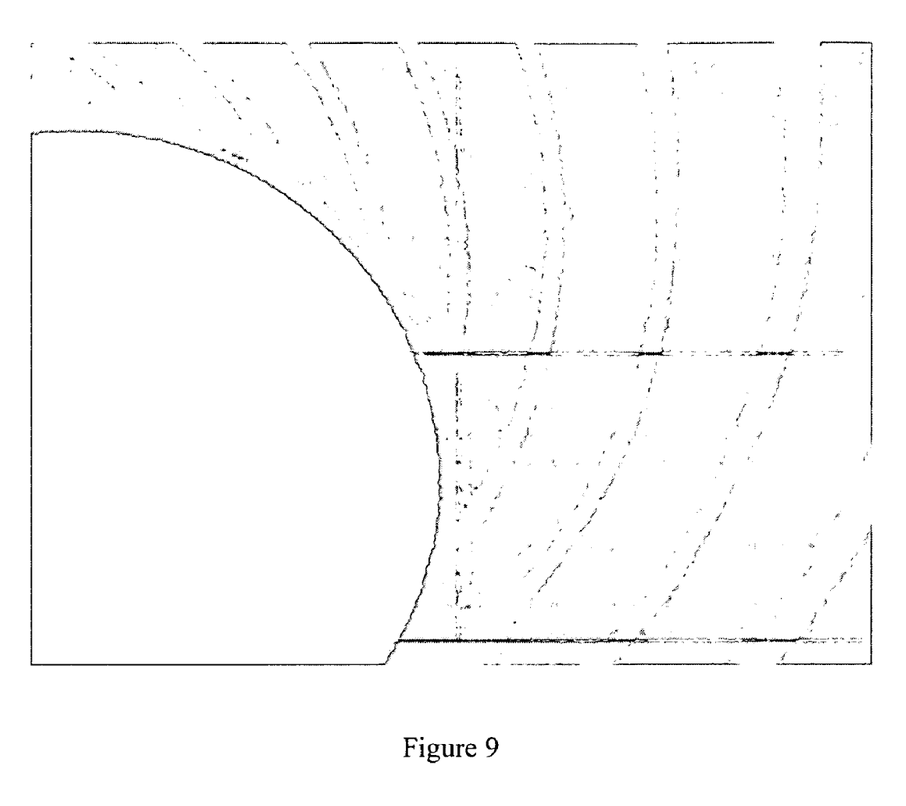
FIG. 9 shows an optical image of a patterned electrode of the embodiments of this invention having minimum feature width of 12 microns.

FIG. 9 shows an embodiment of an electrode of this invention such as that of FIG. 8b patterned with a photoresist and used to form reactively etched grooves on a workpiece. The features on the electrode manufactured this way are due to the dielectric layer which leaves the active metal electrode surface unchanged. This leads to eliminating heat generation due to the electrode profile that greatly increases the electrode working lifetime and reliability.

In this application, the word "containing" means that a material comprises the elements or compounds before the word "containing" but the material could still include other elements and compounds. This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments could be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. An electrode comprising a dielectric layer that forms a surface of the electrode and an active zone comprising a metal embedded below the surface of the electrode,
   wherein the dielectric layer comprises a groove pattern comprising grooves extending from the surface of the electrode to an upper surface of the active zone, and wherein the groove pattern comprises grooves having a feature width of 25 microns or less, and
   wherein the grooves comprise a V-shape having a broad opening in the dielectric layer at the active zone and a narrow opening at the surface of the electrode.

2. The electrode of claim 1, wherein the dielectric layer comprises $SiN_x$, $SiO_2$, or benzocyclobutene.

3. The electrode of claim 1, wherein the groove pattern comprises grooves having a feature width of 12 microns or less.

4. The electrode of claim 1, wherein the dielectric layer has a thickness in a range of about 1 to 5 microns.

5. A method of manufacturing an electrode comprising:
depositing a dielectric layer on a surface of a metal;
depositing a photoresist layer on the dielectric layer;
printing a groove pattern on the photoresist layer;
etching or physico-chemically removing portions of the dielectric photoresist layers to form a groove pattern in the dielectric layer, wherein the groove pattern comprises grooves having a feature width of 25 microns or less, and wherein the grooves comprise a V-shape having a narrow opening at a surface of the dielectric layer;
removing the photoresist layer; and
depositing a metal in the grooves below the surface of the dielectric layer to produce the electrode.

6. The method of claim 5, wherein the metal is Cu.

7. A method comprising:
contacting an electrode to a workpiece with a gap of 5 microns or less between the electrode and the workpiece, and forming a groove pattern in the workpiece,
wherein the electrode comprises a groove pattern comprising grooves having a feature width of 25 microns or less, wherein the grooves in the electrode comprise a V-shape having a narrow opening at a surface of the electrode proximal the workpiece and a broad opening distal the workpiece, wherein the grooves in the electrode comprise a metal at the broad openings thereof, and wherein the metal is below the surface of the electrode.

8. The method of claim 7, wherein the groove pattern is formed in the workpiece without arcing.

9. The method of claim 8, wherein the gap is substantially zero.

10. The method of claim 9, further comprising focusing energy from the electrode to the workpiece to substantially prevent overburn of the groove pattern in the workpiece.

* * * * *

UNITED STATES PATENT AND TRADEMARK OFFICE
CERTIFICATE OF CORRECTION

PATENT NO. : 7,625,468 B2  Page 1 of 1
APPLICATION NO. : 11/375010
DATED : December 1, 2009
INVENTOR(S) : Parkhomovsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this

Second Day of November, 2010

David J. Kappos
*Director of the United States Patent and Trademark Office*